United States Patent Office 3,338,328
Patented Aug. 29, 1967

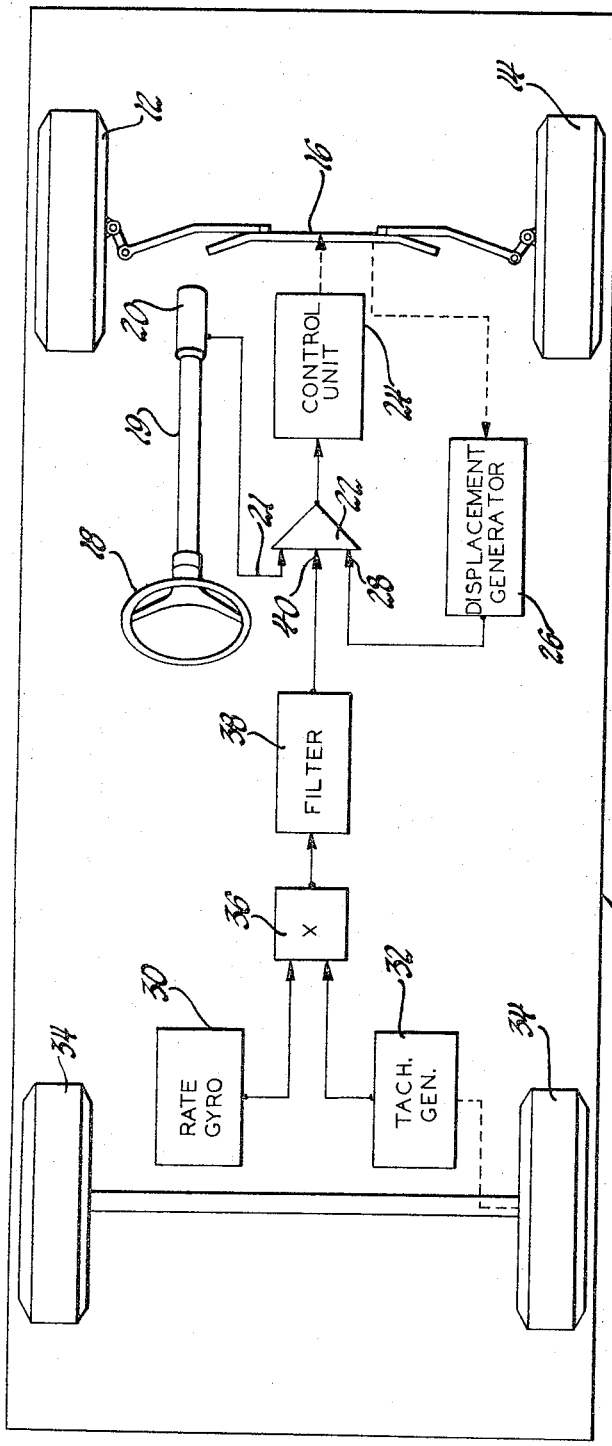
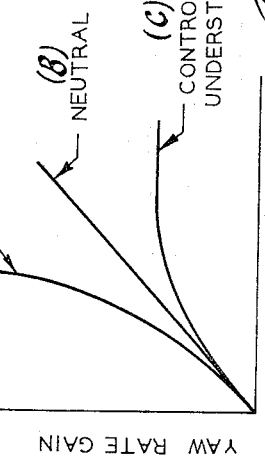
INVENTOR.
Roy S. Cataldo
BY
Thomas N. Young
ATTORNEY

3,338,328
STEERING CONTROL SYSTEM
Roy S. Cataldo, Birmingham, Mich., assignor to General Motors Corporation, Detroit, Mich., a corporation of Delaware
Filed Aug. 8, 1966, Ser. No. 571,084
5 Claims. (Cl. 180—79.1)

This invention relates to vehicle steering systems and, more particularly, to a system for synthesizing an understeer characteristic which is substantially constant irrespective of vehicle speed.

The steering or "handling" characteristics of automotive vehicles may be discussed in terms of "yaw rate gain" which is defined as the ratio of yaw rate to dirigible wheel angle. Vehicle "yaw" is, of course, a turning of the vehicle about an axis which is normal to the plane of the roadway. Assuming constant dirigible wheel angle, yaw rate typically varies as a function of vehicle speed. The actual relationship between gain and speed may vary from "oversteer," where yaw rate increases exponentially with increasing speed despite a constant wheel angle, to "understeer," where yaw rate increases in somewhat less than direct proportion to vehicle speed. The most desirable characteristic for some types of vehicles is understeer since the handling of a vehicle exhibiting understeer is more nearly uniform over a given speed range.

Understeer may be promoted in various ways including design of the suspension geometry to promote a roll tendency. However, in many vehicles, oversteer cannot be fully compensated through the suspension geometry. Further, vehicle handling characteristics are also dependent to a significant degree upon load distribution and tire stiffness. No single mechanical modification can be made for all conditions. Therefore, the typical dirigible vehicle inherently exhibits a varying handling characteristic for which compensation must be made by the operator.

In accordance with the present invention, an automotive vehicle having dirigible road wheels may be caused to exhibit a desirably uniform understeer characteristic which is substantially unaffected by normal changes in load distribution and tire stiffness. Moreover, this characteristic is promoted without the necessity of introducing a roll tendency through the suspension geometry. This is accomplished by means of a steering-control system wherein a signal representing the product of vehicle yaw rate and vehicle speed is combined with a desired wheel-angle signal and employed in positioning the dirigible wheels. The result is a synthesized understeer characteristic in which the vehicle maintains a constant yaw rate for a given wheel angle command, irrespective of vehicle speed over a given range.

The invention as well as the various advantages thereof is best described by reference to the following specification. This specification gives a detailed description of a specific embodiment of the invention and is to be taken wtih the accompanying drawings of which:

FIGURE 1 is a plan view of an automotive vehicle equipped with the present invention, the details of which are illustrated in block diagram;

FIGURE 2 is a graphic portrayal of vehicle handling characteristics, and

FIGURE 3 illustrates the transfer function of one of the components of the system shown in FIGURE 1.

Referring first to FIGURE 2, curve A illustrates the typical oversteer characteristic. In a vehicle exhibiting oversteer, yaw rate increases exponentially with increasing speed despite the maintenance of a constant dirigible wheel angle. In conventionally equipped vehicles, the position of the dirigible wheels is determined exclusively by the position of the steering member. Therefore, the operator must compensate for the oversteer by manipulating the steering member during any speed change which tends to vary the yaw rate.

Curve B exhibits what is termed "neutral" steering which means that yaw rate increases approximately in proportion to vehicle speed, assuming constant dirigible wheel position.

Curve CV exhibits a highly desirable "controlled understeer" characteristic wherein yaw rate is constant over a substantial range of vehicle speed. The controlled understeer is, therefore, the most uniform handling characteristic. The system shown in FIGURE 1 tends to promote vehicle handling which is characterized by curve C by synthesizing an understeer characteristic. Accordingly, the operator of the vehicle will appreciate a response in which yaw rate remains constant for a given steering command which is introduced by way of the steering member. The dirigible wheels, however, are controlled by means of the steering system to be repositioned in order to compensate for the inherent handling characteristic of the vehicle.

Referring to FIGURE 1, a vehicle 10 is equipped with dirigible road wheels 12 and 14 which are mounted forwardly on the vehicle in the conventional fashion. Wheels 12 and 14 are connected by a steering linkage which includes pitman shaft 16. Steering command signals are manually entered into the steering system by way of a conventional steering member 18 which is located in the driver's compartment. Member 18 is connected by way of a shaft 19 to a signal generator 20 which produces a voltage which varies in magnitude and polarity according to the angle and direction of rotation of member 18. This voltage represents desired turning rate or yaw rate and is selected by the operator in accordance with his own judgment. The voltage is connected to a first input 21 of a summing amplifier 22. The summing amplifier has several inputs and an output which is connected to a steering control unit 24 which is mechanically connected to the pitman shaft 16. Control unit 24, which may comprise an electrohydraulic system, responds to the character of the output signal from amplifier 22 to position the dirigible wheels 12 and 14 accordingly.

A closed-loop electro-hydraulic steering system is provided by means of displacement signal generator 26 which is mechanically connected to pitman shaft 16 to produce an output voltage representing the actual position to the shaft 16. The signal thus represents the actual angular position of wheels 12 and 14. This signal is connected to input 28 of amplifier 22 for the purpose of comparing the actual position of the dirigible wheels to that initially commanded by steering member 18. Non-correspondence between signals on inputs 21 and 28 produces an error signal which operates through control unit 24 to move pitman shaft 16 to reduce the deviation to zero. Displacement generator 26 may, of course, include a phase-shifting device such that the voltages from generators 20 and 26 cancel whenever the deviation is zero.

Equipped with only the electro hydraulic steering system which has been thus far described, the vehicle 10 would exhibit a handling characteristic which is determined by the weight distribution, tire stiffness, etc. as previously described. To produce the controlled understeer characteristic illustrated by curve C in FIGURE 2, the steering system further includes a rate gyro 30 which is mounted on the vehicle 10 to produce an output signal corresponding to the yaw rate of the vehicle. Suitable aircraft type gyros are commercially available. In addition, tachometer generator 32 is mechanically connected to one of the rear wheels 34 so as to produce an output signal representing vehicle speed. The vehicle yaw rate and vehicle speed signals are multiplied at 36 and the product of the multiplication is applied through a lead-lag filter 38 to input 40 of amplifier 22. Multiplier 36 may include a potentiometer in which the voltage across the resistor element is determined by the output of generator 32 and the wiper position is determined by the output of gyro 30. Other multiplier schemes will be apparent to those skilled in the art. Filter 38 is a conventional lead-lag filter, the transfer function of which is illustrated in FIGURE 3. The gain of the filter 38 increases rapidly over a predetermined input frequency range 42 in order to increase the effect of the yaw rate-speed signal whenever the signal varies at or above a predetermined rate.

The yaw rate-speed signal which is applied to input 40 is thus summed with the command signal on input 21 and the feedback signal on input 28 and applied to control unit 24. The yaw rate-speed signal thus modifies the command signal by an amount proportional to yaw rate and instantaneous vehicle speed in order to promote the controlled understeer characteristic of FIGURE 2C. The actual calibration of the system depends, of course, upon the inherent handling characteristic of the particular vehicle to which the invention is applied.

In addition to providing more uniform, predicatable, steering, the present invention also provides stiffer, more stable steering which tends to resist lateral accelerations and directional deviations such as those caused by wind gusts. The filter 38 increases the speed of response of the system and is particularly advantageous in minimizing the lag between steering command and response which may be present in front-heavy vehicles.

It is to be understood that the foregoing description is illustrative in nature and is not to be construed as limiting the invention. For definition of the invention, reference should be had to the appended claims.

What is claimed is:
1. In a vehicle having dirigible wheels, a steering control system for synthesising a desired uniform understeer characteristic comprising:
   a manually operable steering member for producing a first signal representing desired yaw rate,
   vehicle response-sensing means mounted on the vehicle for producing a second signal representing the product of actual vehicle yaw rate and vehicle speed,
   summing means having inputs connected to receive the first and second signals for producing an output signal representing the sum of the signals received thereby,
   said summing means being adjustable so that said output signal corresponds to a decrease in yaw rate for a vehicle having a normal steering characteristic which produces less than the desired understeer and to an increase in yaw rate for a vehicle having a normal steering characteristic which produces more than the desired understeer,
   and a steering control unit operatively connected to position the wheels according to the output signal.
2. Apparatus as defined in claim 1 wherein the response-sensing means comprises a rate gyro responsive to vehicle yaw, a tachometer generator responsive to vehicle speed, and means for multiplying the respective outputs of the gyro and generator.
3. Apparatus as defined in claim 1 including feedback means for producing a third signal representing actual wheel angle, the feedback means being connected to an input of the summing means.
4. Apparatus as defined in claim 1 including gain-changing filter means connected between the response-sensing means and the summing means for non-linearly increasing the effect of the second signal whenever the second signal varies above a predetermined rate.
5. Apparatus as defined in claim 3 wherein the first, second and third signals are electrical quantities, and the steering control unit includes electro-hydraulic actuator means responsive to electrical signal quantities to vary the position of the dirigible wheels.

References Cited

UNITED STATES PATENTS 3,022,850    2/1962    Bidwell et al. _____ 180—79.2
3,067,832    12/1962    Wohl _____ 180—79.2

BENJAMIN HERSH, *Primary Examiner.*

JAMES H. BRANNEN, *Assistant Examiner.*